United States Patent [19]

Denzinger et al.

[11] Patent Number: 5,232,603

[45] Date of Patent: Aug. 3, 1993

[54] USE OF WATER-SOLUBLE COPOLYMERS OF MONOETHYLENICALLY UNSATURATED CARBOXYLIC ACIDS AND VINYLIMIDAZOLES OR DERIVATIVES THEREOF FOR WATER TREATMENT

[75] Inventors: Walter Denzinger, Speyer; Heinrich Hartmann, Limburgerhof; Charalampos Gousetis, Ludwigshafen; Ulrich Goeckel, Boehl-Iggelheim; Alfred Ruland, Schriesheim, all of Fed. Rep. of Germany

[73] Assignee: BASF Aktiengesellschaft, Ludwigshafen, Fed. Rep. of Germany

[21] Appl. No.: 775,970

[22] PCT Filed: May 10, 1990

[86] PCT No.: PCT/EP90/00752

§ 371 Date: Nov. 1, 1991

§ 102(e) Date: Nov. 1, 1991

[87] PCT Pub. No.: WO90/14314

PCT Pub. Date: Nov. 29, 1990

[30] Foreign Application Priority Data

May 13, 1989 [DE] Fed. Rep. of Germany ....... 3915772

[51] Int. Cl.$^5$ .............................................. C02F 5/12
[52] U.S. Cl. .................................... 210/698; 210/701; 252/180
[58] Field of Search .............................. 210/698–701; 252/82, 180, 181

[56] References Cited

U.S. PATENT DOCUMENTS

| | | | |
|---|---|---|---|
| 3,514,376 | 5/1970 | Salutsky | 203/7 |
| 3,634,366 | 1/1972 | Chujo et al. | 260/78.5 |
| 3,709,816 | 1/1973 | Walker et al. | 210/701 |
| 3,755,264 | 8/1973 | Testa | 210/698 |
| 3,810,834 | 5/1974 | Jones et al. | 210/698 |
| 3,904,522 | 9/1975 | Greenfield | 252/180 |
| 4,243,591 | 1/1981 | Magin | 260/326.22 |
| 4,647,396 | 3/1987 | Denzinger et al. | 252/174.24 |
| 4,673,508 | 6/1987 | Coleman | 210/698 |
| 4,711,726 | 12/1987 | Pierce et al. | 210/701 |
| 4,740,314 | 4/1988 | Kneller | 252/180 |
| 4,913,824 | 4/1990 | Kneller | 252/180 |
| 4,980,088 | 12/1990 | Boeckh et al. | 252/180 |
| 5,073,269 | 12/1991 | Denzinger et al. | 210/698 |

FOREIGN PATENT DOCUMENTS

0276464 12/1987 European Pat. Off. .

Primary Examiner—Peter Hruskoci
Attorney, Agent, or Firm—Oblon, Spivak, McClelland, Maier & Neustadt

[57] ABSTRACT

Water-soluble copolymers which contain, polymerized in, as characteristic monomers
(a) 99 to 50% by weight of monoethylenically unsaturated carboxylic acids with 3 to 8 carbon atoms or their salts and
(b) 1 to 50% by weight of N-vinylimidazole or substituted N-vinylimidazoles, their salts or products of quaternization and which have K values of from 10 to 50 are used for water treatment to reduce deposits of scale and sludge in water-conveying systems.

3 Claims, No Drawings

USE OF WATER-SOLUBLE COPOLYMERS OF MONOETHYLENICALLY UNSATURATED CARBOXYLIC ACIDS AND VINYLIMIDAZOLES OR DERIVATIVES THEREOF FOR WATER TREATMENT

The present invention relates to the use of water-soluble copolymers of monoethylenically unsaturated carboxylic acids and vinylimidazoles for water treatment and scale inhibition.

US-B 3,810,834 discloses the use of hydrolyzed polymaleic anhydrides which have a molecular weight of from 300 to 5,000 before the hydrolysis, or the water-soluble salts thereof, for treating water in order substantially to reduce or prevent scale formation. The polymers suitable for this purpose are prepared by polymerization of maleic anhydride in toluene, using benzoyl peroxide, and subsequent hydrolysis of the resulting polymaleic anhydride. Since maleic anhydride does not polymerize completely and it is difficult to remove unpolymerized maleic anhydride from the polymer, the polymaleic acids contain considerable amounts of maleic acid.

US-B 3,755,264 discloses low molecular weight copolymers which contain 85 to 99 mol % maleic anhydride and, polymerized in to make up to 100 mol %, acrylic acid, vinyl acetate, styrene or mixtures thereof. The copolymers are prepared by copolymerization of maleic anhydride with the said monomers in dry organic solvents at from 100° to 145° C. in the presence of peroxides. Examples of suitable peroxides are di-tert-butyl peroxide, acetyl peroxide, dicumyl peroxide, diisopropyl percarbonate and, in particular, benzoyl peroxide. The anhydride copolymer can subsequently be hydrolyzed to the acid or converted into the salts. The water-soluble copolymers are used to prevent deposition of scale. The products obtainable by this process contain a very large amount of unpolymerized maleic anhydride.

The use of low molecular weight polymers of acrylic acid for water treatment or scale inhibition is disclosed, for example, in US-B 3,904,522 and US-B 3,514,376. US-B 3,709,816 discloses that copolymers containing acrylamidopropanesulfonic acid are suitable for water treatment. Suitable examples are copolymers with 2-acrylamidopropanesulfonic acid and acrylamide which is partially hydrolyzed. The disadvantage of these is that residues of acrylamide monomer are unavoidable in the polymers, which means that they can be recommended for use only with great restrictions. On the other hand, acrylic acid homopolymers have a satisfactory effect only on types of deposits which are relatively easy to reduce, such as calcium carbonate.

The object of the present invention is to provide polymers for water treatment which equal or even exceed the effectiveness of the polymers based on acrylic acid which have been used hitherto, and which are also more soluble at high calcium ion concentrations than the polyacrylates hitherto used. In particular, the intention is effectively to reduce especially difficult problems of deposits in water-conveying systems, such as the formation of calcium phosphate and of silicate deposits.

We have achieved this object according to the invention by using water-soluble copolymers which contain, polymerized in, as characteristic monomers (a) 99 to 50% by weight of monoethylenically unsaturated carboxylic acids with 3 to 8 carbon atoms or their salts and
(b) 1 to 50% by weight of monomers of the formula

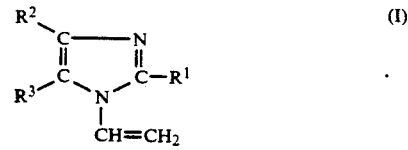

where $R^1$, $R^2$ and $R^3$ are H, $C_1$—$C_4$—alkyl, phenyl or benzyl, their salts or products of quaternization and which have K values of from 10 to 50 (determined in 1% strength aqueous solution at pH 7 and 25° C. by the method of H. Fikentscher) for water treatment.

Copolymers of the type described above are known in principle. Thus, for example, US-B 3,634,366 describes a copolymer of acrylic acid and 1-vinyl-2-methylimidazole. The copolymers are prepared by copolymerization of the monomers in the presence of polymerization initiators. The copolymers to be used according to the invention contain as characteristic monomers of group (a) monoethylenically unsaturated carboxylic acids with 3 to 8 carbon atoms or their salts. Examples of these monomers are acrylic acid, methacrylic acid, dimethylacrylic acid, ethacrylic acid, maleic acid, citraconic acid, methylenemalonic acid, allylacetic acid, vinylacetic acid, crotonic acid, fumaric acid, mesaconic acid and itaconic acid. Monomers from this group which are preferably used for the preparation of the copolymers to be used according to the invention are acrylic acid, methacrylic acid or maleic acid and mixtures of the said carboxylic acids, especially mixtures of acrylic acid and maleic acid. These monomers can be present in the copolymers either in the form of the free acids or in a form which is partially or completely neutralized. These monomers are neutralized where appropriate with alkali metal bases, ammonia or amines. The bases of particular practical importance are solutions of sodium or potassium hydroxide and ammonia. It is equally possible to carry out the neutralization with amines such as ethanolamine, diethanolamine or triethanolamine. The monomers of group (a) contribute 99 to 50, preferably 95 to 70%, by weight of the structure of the copolymers.

The copolymers contain, polymerized in, as characteristic monomers of group (b) compounds of the formula

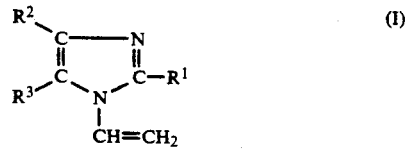

where $R^1$, $R^2$ and $R^3$ are H, $C_1$—$C_4$—alkyl, phenyl and benzyl and the salts or products of quaternization of the compounds of the formula I. To form salts, the monomers of the formula I are neutralized with acids, e.g. hydrochloric acid, sulfuric acid, nitric acid, phosphoric acid, formic acid, acetic acid, propionic acid, amidosulfonic acid or p-toluenesulfonic acid. The quaternization of the compounds of the formula I can be carried out with conventional quaternizing agents, e.g. dimethyl sulfate, diethyl sulfate, methyl chloride, ethyl chloride, butyl chloride, ethylhexyl chloride, n-dodecyl chloride and benzyl chloride. It is also possible to carry out subsequent quaternization with conventional quaternizing agents of copolymers which contain a compound of the formula I polymerized in.

Examples of suitable compounds of the formula I are 1-vinylimidazole, 1-vinyl-2-methylimidazole, 1-vinyl-4-methylimidazole, 1-vinyl-5-methylimidazole, 1-vinyl-2-ethylimidazole, 1-vinyl-2-propylimidazole, 1-vinyl-2-phenylimidazole, 1-vinyl-4,5-benzimidazole and 1-vinyl-2-benzimidazole [sic]. To prepare the copolymers, the said compounds can be subjected to the copolymerization either alone or mixed with one another. The monomer from this group which is preferably used is 1-vinylimidazole. The monomers of group (b) contribute from 1 to 50, preferably 5 to 30%, by weight of the structure of the copolymers.

The copolymers can be modified by containing, polymerized in, as a further group of monomers (c) other monoethylenically unsaturated monomers which can be copolymerized with monomers (a) and (b). The amount of these monomers polymerized into the copolymers of (a) and (b) is only such that the copolymers are still soluble in water. The amount of monomers (c) can therefore vary within a wide range. Where the monomers ((c) are polymerized into the copolymers for modification, they contribute up to 20% by weight of the structure of the copolymers. It is possible to use for the modification, for example, esters, amides and nitriles of the carboxylic acids mentioned under (a). Examples of preferred compounds of this type are methyl acrylate, ethyl acrylate, methyl methacrylate, ethyl methacrylate, hydroxyethyl acrylate, hydroxypropyl acrylate, hydroxybutyl acrylate, hydroxyethyl methacrylate, hydroxypropyl methacrylate, monomethyl maleate, dimethyl maleate, monoethyl maleate, diethyl maleate, acrylamide, methacrylamide, N-dimethylacrylamide [sic], N-tert-butylacrylamide, dimethylaminopropylmethacrylamide, acrylamidoglycolic acid, acrylonitrile and methacrylonitrile. Also suitable as monomers of group (c) are those containing sulfo groups, e.g. vinylsulfonic acid, allylsulfonic acid, methallylsulfonic acid, styrenesulfonic acid, 3-sulfopropyl acrylate, 3-sulfopropyl methacrylate and acrylamidomethylpropanesulfonic acid, and those containing phosphono groups such as vinylphosphonate [sic], allylphosphonate [sic] and acrylamidomethanepropanephosphonic [sic] acid. Further suitable monomers of group (c) are N-vinylpyrrolidone, N-vinylcaprolactam, N-vinylformamide, N-vinyl-N-methylformamide, N-vinylacetamide, N-vinyl-N-methylacetamide, N-vinyl-2-methylimidazo.ine, diallyldimethylammonium chloride, vinyl acetate and vinyl propionate. It is of course also possible to use mixtures of the said monomers of group (c), e.g. ethyl acrylate and vinyl acetate or acrylamide and hydroxyethyl acrylate. Monomers of group (c) particularly suitable for the modification of the copolymers of (a) and (b) are vinylsulfonic acid, acrylamidomethanepropanesulfonic [sic] acid, N-vinylpyrrolidone, N-vinylformamide, diallyldimethylammonium chloride and vinyl acetate. Where the monomers of group (c) are polymerized in the copolymers of (a) and (b) for modification, they are preferably present in amounts of up to 10% by weight.

The use of copolymers which contain, polymerized in, (a) 95 to 70% by weight of acrylic acid, methacrylic acid, maleic acid or mixtures of the said carboxylic acids and
(b) 5 to 30% by weight of N-vinylimidazole and
(c) 0 to 10% by weight of vinylsulfonic acid, acrylamidomethylpropanesulfonic acid, N-vinylpyrrolidone, N-vinylformamide, diallyldimethylammonium chloride or hydroxypropyl acrylate is particularly preferred. The copolymers are preferably used in completely or partly neutralized form. The copolymers have K values of from 10 to 50, preferably 15 to 40 (determined on 1% by weight solutions of the sodium salts of the copolymers at pH 7 and 25° C. by the method of H. Fikentscher).

The copolymers can be prepared by all conventional continuous or batchwise processes of bulk, precipitation, suspension and solution polymerization in the presence of polymerization initiators which form radicals under the polymerization conditions, e.g. inorganic and organic peroxides, persulfates, azo compounds and redox catalysts.

Suitable and preferred radical initiators are all those compounds which have a half-life of less than 3 hours at the chosen polymerization temperature. If the polymerization is started at low temperature and completed at higher temperature, it is expedient to use at least 2 initiators which decompose at different temperatures, i.e. an initiator which decomposes at low temperature to start the polymerization and then an initiator which decomposes at higher temperature for completion of the main polymerization. It is possible to employ initiators which are soluble or insoluble in water or mixtures of the two types. Initiators which are insoluble in water are soluble in the organic phase. Examples of initiators which can be used for the following temperature ranges are indicated:

Temperature: 40° to 60° C.: acetyl cyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), 2,2'-azobis(2-methyl-N-phenylpropionamidine) dihydrochloride and 2,2'-azobis(2-methylpropionamidine) dihydrochloride Temperature: 60° to 80° C.: tert-butyl perpivalate, dioctanoyl peroxide, dilauroyl peroxide and 2,2'-azobis(2,4-dimethylvaleronitrile)

Temperature: 80° to 100° C.: dibenzoyl peroxide, tert-butyl per-2-ethylhexanoate, tert-butyl permaleate, 2,2'-azobis(isobutyronitrile) and dimethyl 2,2'-azobisisobutyrate Temperature: 100° to 120° C.: bis(tert-butylperoxide)cyclohexane [sic], tert-butyl peroxyisopropyl [sic] carbonate and tert-butyl peracetate Temperature: 120° to 140° C.: 2,2-bis(tert-butylperoxy)-butane, dicumyl peroxide, di-tert-amyl peroxide and di-tert-butyl peroxide Temperature: >140° C.: p-methane [sic] hydroperoxide, penane [sic] hydroperoxide, cumene hydroperoxide and tert-butyl hydroperoxide Additional use of salts or complexes of heavy metals, e.g. copper, cobalt, manganese, iron, nickel and chromium salts or organic compounds such as benzoin, dimethylaniline or ascorbic acid together with at least one of the abovementioned initiators may reduce the half-lives of the radical initiators mentioned. Thus, for example, tert-butyl hydroperoxide can be activated by addition of 5 ppm copper(II) acetylacetonate so that polymerization can be carried out at only 100° C. The reducing component of redox catalysts can also be formed, for example, by compounds such as sodium sulfite, sodium bisulfite, sodium formaldehyde bisulfite and hydrazine. Based on the monomers used in the polymerization, 0.01 to 20, preferably 0.05 to 10, % by weight of a polymerization initiator or a mixture of several polymerization initiators is used. 0.01 to 5% of the reducing compounds are added as the redox components. Heavy metals are used in the range from 0.1 to 100 ppm, preferably 0.5 to 10 ppm. It is often advantageous to employ a combination of peroxide, reducing agent and heavy metal as redox catalyst. Copolymerization of the essential monomers (a) and (b) can also be carried out by exposure to ultraviolet radiation in the presence or absence of UV initiators. The conventional photoinitiators and sensitizers suitable for polymerization by exposure to UV radiation are used for this purpose. Examples of these are compounds such as benzoin and benzoin ethers, α-substituted benzoin compounds such as α-methylolbenzoin and α-methylolbenzoin ethers, α-methylbenzoin or α-phenylbenzoin. It is also possible to use triplet sensitizers such as benzyl [sic] diketals. Examples of sources of UV radiation used are, besides high-energy UV lamps such as carbon arc lamps, mercury vapor lamps or xenon lamps, also low-UV light sources such as fluorescent tubes with a high blue content.

In order to prepare polymers with a low K value, the polymerization is expediently carried out in the presence of regulators. Examples of suitable regulators are mercapto compounds such as mercaptoethanol, mercaptopropanol, mercaptobutanol, mercaptoacetic acid, mercaptopropionic acid, butyl mercaptan and dodecyl mercaptan. Also suitable as regulators are allyl compounds such as allyl alcohol, aldehydes such as formaldehyde, acetaldehyde, propionaldehyde, n-butyraldehyde and isobutraldehyde, formic acid, propionic acid, hypophosphorous acid and phosphorous acid. If the polymerization is carried out in the presence of regulators, 0.05 to 20% by weight of these are required, based on the monomers used in the polymerization. In order to prepare copolymers with K values from 30 to 50, it may be expedient to carry out the copolymerization also in the presence of monomers which have at least two ethylenically unsaturated unconjugated double bonds in the molecule. This group of monomers comprises, for example, croslinkers such as methylenebisacrylamide, esters of acrylic acid and methacrylic acid with polyhydric alcohols, e.g. glycol diacrylate, glycerol triacrylate, glycol dimethacrylate and glycerol trimethacrylate, and polyols esterified at least twice with acrylic acid or methacrylic acid, such as pentaerythritol and glucose. Other suitable crosslinkers are divinylbenzene, divinyldioxane, pentaerythritol triallyl ether and pentaallylsucrose. If crosslinkers are used in the copolymerization, the amount thereof is up to 5% by weight based on the total monomers.

In bulk polymerization, the monomers are heated together with the radical initiators, it usually being necessary to heat the reactants to above the softening point in order to keep the mass fluid. Preparation is expediently carried out continuously in order to be able reliably to dispel the high heat of polymerization. This usually results in polymers with K values in the range from 10 to about 30. To prepare copolymers with K values of more than 30 to 50, precipitation or suspension polymerization can be used. In precipitation polymerization, the monomers are soluble in the diluent, and the copolymers which are formed are insoluble and therefore precipitate out. In suspension polymerization, monomers and polymers are insoluble in the diluent. In order to prevent the copolymer particles sticking together, the copolymerization is expediently carried out in the presence of protective colloids. After completion of the copolymerization, the copolymers can be isolated in solid form by filtration and drying. The preferred polymerization method is solution polymerization in which monomers and copolymers are dissolved in the solid. Particularly suitable solvents for solution polymerization are water, secondary alcohols and mixtures of water and secondary alcohols. Where water is used as solvent, the polymerization must be carried out in the presence of regulators otherwise the resulting copolymers have too high a K value. On the other hand, if the monomers are polymerized in secondary alcohols it is possible to dispense with the addition of regulators because it is known that secondary alcohols act as regulators.

The polymerization in the said process is carried out in such a way that the polymer concentration is from 5 to 80, preferably 10 to 60, % by weight. Suitable temperatures are from 20° to 250°, preferably 40° to 180° C. Very particularly preferred temperatures for the copolymerization in practice are from 60° to 130° C. Where the temperature is above the boiling point of the solvent or mixture thereof, the copolymerization is carried out under elevated pressure. When the copolymerization is carried out in an organic solvent, after its completion the reaction mixture is neutralized where appropriate and then subjected to steam distillation to remove the organic solvent. It is of course also possible to remove the organic solvent from the reaction mixture by distillation and then to add water in order to obtain a copolymer solution. The copolymer is neutralized if desired. The aqueous copolymer solutions obtained in this way can be used directly for water treatment to reduce the deposition of scale and sludge in water-conveying systems. It is possible to combine the polymers according to the invention with other dispersing agents such as phosphonates, phosphonoalkanecarboxylic acids etc.

The mode of action of the copolymers to prevent deposits in water treatment comprises prevention of the formation of crystals of the salts responsible for hardness, such as calcium carbonate, magnesium oxide, magnesium carbonate, calcium, barium or strontium sulfate, calcium phosphate (apatite) and the like at a dose which is less than stoichiometric, or influencing the formation of these precipitates in such a way that no hard deposits are produced and only sediments which are finely divided in the water and can easily be flushed out are formed. In this way the surfaces of, for example, heat exchangers, pipes or pump components are kept free of deposits and their proneness to corrosion is reduced. In particular, the danger of pitting and perforation under these deposits is reduced. In addition, the growth of microorganisms on these metal surfaces is impeded. Prevention of deposits in this way is able to increase the useful life of such systems and reduce considerably stoppages for cleaning components. The amounts of the antideposit agents required for this purpose are from 0.1 to 100, preferably 0.5 to 25, ppm based on the amount of water in each case. The water-conveying systems are, for example, open or closed cooling circulations, for example of power stations or chemical plants, such as reactors, distillers and similar components, where heat must be dispelled. The antideposit agents can also be used in boiler water and vaporizers, preferably at water temperatures below 150° C. A preferred use of the antideposit agents to be used according to the invention is the desalination of seawater and brackish water by distillation or membrane processes, such as reverse osmosis or electrodialysis. Thus, for example, in the multistage flash evaporation (MSF) process for desalination of seawater, concentrated seawater is circulated at elevated temperature. In this case the antideposit agents effectively suppress deposits of, for example, brucite and their adherence to components of the system.

In membrane processes, the damage to the membranes from crystallization of hardness-producing salts can be effectively prevented. These antideposit agents thus make possible higher concentration factors, improved yields of pure water and longer useful lives of the membranes. Another use of the antideposit agents is, for example, in the evaporation of syrups from cane or beet sugar. In contrast to the uses described above, in this case calcium hydroxide, carbon dioxide, sulfurdioxide or phosphoric acid, for example, is added to purify the light syrup. Sparingly soluble calcium salts such as calcium carbonate, sulfate or phosphate remaining in the syrup after filtration then precipitate during the evaporation process and may produce hard deposits on the surfaces of heat exchangers. This also applies to substances also present in the sugar, such as silica or calcium salts of organic acids such as oxalic acid.

Similar statements apply to processes following sugar production, e.g. alcohol production from residues thereof.

The copolymers which can be used according to the invention to prevent deposits are able substantially to suppress the abovementioned deposits so that system stoppages for cleaning, e.g. by boiling out, can be considerably reduced. Another essential point in this connection is the considerable saving in energy due to prevention of these deposits of low thermal conductivity.

The amounts of antideposit agent required for the described uses vary, but are from 0.1 to 100 ppm based on the cooling, boiler or process water used or, for example, syrup.

The products to be used according to the invention are more effective at dispersing salts such as calcium carbonate, sulfate and phosphate and, furthermore, are more compatible with calcium ions than are acrylic acid homopolymers.

The K values of the copolymers were determined by the method of H. Fikentscher, Cellulosechemie, 13 (1932) 48 to 64 and 71 to 74, in aqueous solution at pH 7, 25° C. and a concentration of the sodium salt of the copolymer of 1% by weight. Percentage data relate to the weight of these substances.

EXAMPLES

Preparation of the Copolymers

Copolymer 1

In a reactor equipped with condenser, thermometer, feed devices and an inlet and outlet for nitrogen, a solution of 1.9 g of phosphorous acid in 370 g of water is heated to boiling. To this are added during 4 hours at a constant rate 590 g of acrylic acid, a solution of 63.6 g of N-vinylimidazole in 100 g of water, a solution of 54 g of 2-mercaptoethanol in 50 g of water and a solution of 6.4 g of sodium persulfate and 0.6 g of 2,2'-azobis(2-methylpropionamidine) dihydrochloride in 125 g of water, keeping the reaction mixture boiling gently during the introduction. After the addition of monomers and initiators is complete, the reaction mixture is boiled for 1 hour and then neutralized to pH 7.5 with 620 g of 50% strength aqueous sodium hydroxide solution. The residue on drying is 44%, and the K value of the copolymer is 39.

Copolymer 2

The process described in Example 1 is carried out but using 524 g of acrylic acid and 127.2 g of N-vinylimidazole and, after completion of the copolymerization, neutralizing the aqueous copolymer solution to pH 7.3 by adding 540 g of 50% strength aqueous sodium hydroxide solution. The residue on drying is 45%, and the K value of the copolymer is 47.5.

Copolymer 3

1028.5 g of a mixture of 75% by weight isopropanol and 25% by weight water plus 72 g of 30% strength sodium peroxide are placed in a steel reactor designed for elevated pressure. Nitrogen is passed into the reactor up to a pressure of 3 bar and released again 3 times. The reactor is then sealed and the contents are heated while stirring to 120° C. As soon as this temperature is reached, 508 g of a mixture of 75% isopropanol and 25% water, 1758.5 g of acrylic acid and 189.5 g of N-vinylimidazole and, separately from this, at a constant rate during 8 hours, a mixture of 122 g of 30% strength hydrogen peroxide and 250 g of isopropanol are metered in. The pressure in the reactor is kept constant at 3 bar during the polymerization. After addition of the initiator is complete, the rection mixture is heated at 120° C. for 2 hours and then the pressure is released, with some of the isopropanol distilling out, and subsequently the remaining isopropanol is removed by steam distillation. The reaction mixture is then cooled to 50° C. and neutralized by adding 1850 g of 50% strength aqueous sodium hydroxide solution. The pH of the aqueous solution is 8, the residue on drying is 46.5% and the K value of the copolymer is 30.2.

Copolymer 4

1028.5 g of isopropanol and 78.6 g of 30% strength hydrogen peroxide are placed in the reactor used to prepare copolymer 3, which is then flushed with 3 bar of nitrogen 3 times and, after the reactor has been sealed, heated to 120° C., resulting in a pressure of 3 bar. As soon as the reactor contents are at 120° C., a mixture of 908 g of isopropanol, 1516 g of acrylic acid, 189.5 g of N-vinylimidazole and 189.5 g of acrylamidomethylpropanesulfonic acid is metered in at a constant rate during 5 hours and, separately from this, a solution of 133 g of 30% strength hydrogen peroxide in 270 g of isopropanol is metered in at a constant rate during 6 hours. After the addition of initiator is complete, the reaction mixture is heated at 120° C. for 2 hours, then the pressure is released and isopropanol is distilled out. The reaction mixture is cooled to 50° C. and neutralized to pH 8.1 with 1950 g of 50% strength aqueous sodium hydroxide solution. The solids content of the aqueous solution is 45.1%, and the K value of the copolymer is 33.2.

Copolymer 5

A solution of 1.9 g of phosphorous acid in 370 g of water is placed in the reactor used to prepare copolymer 1, and the solution is heated to boiling. Then 573.3 g of acrylic acid and a solution of 106 g of 1-vinyl-3-methylimidazolium chloride in 58 g of water, a solution of 54 g of 2-mercaptoethanol in 50 g of water and a solution of 6.4 g of sodium persulfate and 0.64 g of 2,2′-azobis(2-methylpropionamidine) hydrochlorid in 125 g of water are added at constant rate during 4 hours. After the addition of initiators and monomers is complete, the reaction mixture is heated at 100° C. for 2 hours, then cooled to 50° C. and neutralized by adding 590 g of 50% strength aqueous sodium hydroxide solution. The solids content of the aqueous solution is 44.5%. The copolymer has a K value of 17.7.

Copolymer 6

A solution of 1.9 g of phosphorous acid in 370 g of distilled water is placed in the reactor used to prepare copolymer 1 and heated to 95° C. To this are added, at a constant rate during 4 hours, a solution of 508.8 g of acrylic acid, 35 g of water and 127.2 g of N-vinylimidazole, a solution of 54 g of mercaptoethanol in 50 g of water and, separately from this, a solution of 3.2 g of sodium persulfate and 3.2 g of 2,2′-azobis(2-methylpropionamidine) hydrochloride in 130 g of water. The result is an aqueous solution of a copolymer with a solids content of 45.6% and a K value of 20.3.

Copolymer 7

1028.5 g of isopropanol and 78.6 g of 30% strength hydrogen peroxide are placed in the reactor used to prepare copolymer 3, which is then flushed with 3 bar of nitrogen 3 times and, after sealing, the contents of the reactor are heated to 120° C. This results in a pressure of 3 bar. As soon as the temperature is 120° C., a mixture of 1327 g of acrylic acid, 529 g of isopropanol, 189.5 g of N-vinylimidazole, 379 g of a 25% strength aqueous acrylamidomethylpropanesulfonic acid solution and 758 g of a 25% strength aqueous acrylamide solution is added at a constant rate during 5 hours, and, separate from this, a solution of 133 g of 30% strength hydrogen peroxide in 271 g of isopropanol is added at a constant rate in 6.5 hours. After the addition of initiator is complete, the reaction mixture is stirred at 120° C. for 1 hour and then the pressure is slowly released while distilling out isopropanol. Steam is then passed into the reaction mixture to remove the isopropanol and this is continued until the temperature has reached 100° C. The reaction mixture is then cooled to 50° C. and neutralized by adding 1200 g of 50% strength aqueous sodium hydroxide solution. The resulting solution has a pH of 8 and a solids content of 43.4%. The K value of the copolymer is 24.5.

Copolymer 8

1028 g of a mixture of 75% sec-butanol and 25% water and 78.6 g of 30% strength hydrogen peroxide are placed in the reactor used to prepare copolymer 3, which is then flushed with 3 bar of nitrogen 3 times and, after sealing, the contents of the reactor are heated to 120° C. As soon as this temperature is reached, a solution of 908 g of sec-butanol, 1326.5 g of acrylic acid, 189.5 g of N-vinylimidazole and 379 g of acrylamidomethylpropanesulfonic acid is metered in during 5 hours, and a solution of 133 g of 30% strength hydrogen peroxide in 270 g of a mixture of 70% by weight sec-butanol and 30% by weight of water is metered in at a constant rate during 6.5 hours. After the addition of initiator is complete, the reaction mixture is heated at 120° C. for 2 hours and the pressure is then slowly released, during which the sec-butanol distils out. The remaining sec-butanol is removed by passing in steam until the internal temperature is 100° C. The reactor contents are then cooled to 50° C. and neutralized by adding 1500 g of 50% strength aqueous sodium hydroxide solution. The resulting copolymer solution has a pH of 7 and a solids content of 51.6%. The K value of the copolymer is 22.6.

Copolymer 9

1028.5 g of a mixture of 75% isopropanol and 25% water and 78.6 g of 30% strength hydrogen peroxide are introduced into the reactor used to prepare copolymer 3, which is then flushed with 3 bar of nitrogen 3 times and, after sealing, heated to 130° C. At this temperature, a mixture of 1706 g of acrylic acid, 189.5 g of N-vinylimidazole and 961 g of a mixture of 75% isopropanol and 25% water is added during 6 hours and, separately from this, a solution of 133 g of 30% strength hydrogen peroxide and 251 g of a mixture of 75% isopropanol and 25% water is added during 8 hours. After the addition of initiator is complete, the reaction mixture is stirred at 130° C. for 2 hours and the pressure is then cautiously released while isopropanol distils out. After the pressure has reached atmospheric, steam is passed in to remove the remaining isopropanol. The reaction mixture is then cooled to 50° C. and neutralized to pH 8.1 with 1890 g of a 50% strength aqueous sodium hydroxide solution. The resulting copolymer solution has a solids content of 51.2%. The K value of the copolymer is 26.4.

Copolymer 10 (Comparison)

Commercial acrylic acid homopolymer with a K value of 30.

The copolymers described above were subjected to the following tests of their suitability for water treatment:

CaSO$_4$ Test 500 ml of a saturated CaSO$_4$ solution is concentrated to 200 g in an oven at 200° C. The mixture is left to stand overnight and then filtered through a membrane filter (0.45 μm).

50 ml of the filtrate is titrated against an aqueous 0.2M solution of Na$_2$H$_2$ EDTA (EDTA=ethylenediaminetetraacetic acid) and the proportion of Ca still in solution is determined. The inhibition on addition of 1 ppm polymer is calculated by comparison with a blank containing no polymer.

% inhibition =

$$100 \left(1 - \frac{\text{mg CaSO}_4 \text{ on the filter (with 1 ppm polymer)}}{\text{mg CaSO}_4 \text{ on the filter (blank without polymer)}}\right)$$

CaCO$_3$ Test

An aqueous test solution is prepared from components A and B:

A = 3.36 g of NaHCO$_3$ per liter

B = 1.58 g of CaCl$_2$·2H$_2$O per liter and 0.88 g of MgSO$_4$ per liter 100 ml of each of the above solutions are pipetted into a 250 ml flask, 5 ppm dispersing agent is added, and the flask is stoppered and stored at 86° C. for 16 hours.

After the solution has been cooled to room temperature and filtered it is titrated against a 0.2M solution of Na$_2$H$_2$EDTA to determine the proportion of dissolved Ca.

% inhibition =

$$100\left(1 - \frac{\text{mg CaO on the filter (with 1 ppm polymer)}}{\text{mg CaO on the filter (blank without polymer)}}\right)$$

Ca$_3$(PO$_4$)$_2$ Test 100 ml of a solution with the following concentrations are prepared:
1.095 g/l CaCl$_2$·6H$_2$O
0.019 g/l Na$_2$HPO$_4$·2H$_2$O
2 ppm polymer The pH is adjusted to 8.6 with a borax buffer. The solution is then stirred at 70° C. for 3 hours and left to stand for 24 hours. After this time the light transmission (LT, white light) is measured with a photometer. 100% LT on the photometer is set with distilled water beforehand.

% inhibition =

$$100\left(1 - \frac{100 - LT \text{ with 2 ppm polymer}}{100 - LT \text{ of a blank without polymer}}\right)$$

Ca Ion Compatibility 200 ml of a solution with the following composition are prepared:
1.565 g of CaCl$_2$·6H$_2$O per liter
3 g of KCl per liter
45 ppm polymer The pH is adjusted to 9 with NaOH and the solution is then boiled for 30 minutes. The boiled solution is then made up to 200 ml with distilled water and the light transmission (LT) is measured (LT for distilled water=100%). The LT is directly related to the compatibility of the product with Ca ions.

The results of the tests are shown in the table.

| Ex. | Co-polymer No. | K value | % Inhibition CaSO$_4$ | % Inhibition CaCO$_3$ | % Inhibition Ca$_3$(PO$_4$)$_2$ | LT % (polymer turbidity) |
|---|---|---|---|---|---|---|
| 1 | 1 | 39 | 35 | 53 | 58 | 83 |
| 2 | 2 | 47.5 | 42 | 45 | 72 | 92 |
| 3 | 3 | 30 | 47 | 49 | 66 | 97 |
| 4 | 4 | 33 | 27 | 43 | 63 | 91 |
| 5 | 5 | 17.7 | 39 | 55 | 73 | — |
| 6 | 6 | 20.3 | 48 | 39 | 70 | — |
| 7 | 7 | 24.5 | 41 | 23 | 78 | — |
| 8 | 8 | 22.6 | 51 | 30 | 72 | 100 |
| 9 | 9 | 26.4 | 39 | 56 | 77 | 97 |
| Comparison Example 10 (acrylic acid hompolymer) | | 30 | 29 | 45 | 61 | <60 |

It is evident from the table that copolymers 2, 3, 5 and 9 are more effective than the acrylic acid homopolymer in all the tests. These copolymers are particularly suitable for treating those water-conveying systems which have high Ca ion concentrations, e.g. in the evaporation of syrup.

Copolymers 1, 4, 6, 7 and 8 are better than the acrylic acid homopolymer in 3 of 4 tests.

We claim:
1. A process for reducing the deposition of scale and sludge in a water-conveying system, which comprises adding to said system an amount effective to reduce deposition of scale and sludge of a water-soluble copolymer of
   (a) 95 to 70% by weight of acrylic acid, methacrylic acid and/or maleic acid or salts thereof and
   (b) 5 to 30% by weight of N-vinylimidazole or the salt or the product of quaternization thereof, which has a Fikentscher-K value of from 10 to 50 determined in 1% strength aqueous solution at pH and 25° C.
2. A process as claimed in claim 1, wherein the copolymer contains copolymerized therein
   (c) up to 20% by weight of another monoethylenically unsaturated monomer which can be copolymerized with monomers (a) and (b).
3. A process as claimed in claim 1, wherein the copolymer is used in amounts of from 0.1 to 100 ppm based on the aqueous medium to be treated.

* * * * *